United States Patent
Zhou et al.

(10) Patent No.: US 10,048,669 B2
(45) Date of Patent: Aug. 14, 2018

(54) OPTIMIZING MANUFACTURING SCHEDULE WITH TIME-DEPENDENT ENERGY COST

(71) Applicant: SAP SE, Walldorf (DE)

(72) Inventors: Wenjun Zhou, Shanghai (CN);
Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 15/014,473

(22) Filed: Feb. 3, 2016

(65) Prior Publication Data
US 2017/0220016 A1 Aug. 3, 2017

(51) Int. Cl.
G05B 19/042 (2006.01)
G05B 15/02 (2006.01)
G06F 9/48 (2006.01)
G06N 7/00 (2006.01)

(52) U.S. Cl.
CPC ......... *G05B 19/0426* (2013.01); *G05B 15/02* (2013.01); *G06F 9/4881* (2013.01); *G06N 7/005* (2013.01); *G05B 2219/23289* (2013.01)

(58) Field of Classification Search
None
See application file for complete search history.

(56) References Cited

U.S. PATENT DOCUMENTS

| | | | | |
|---|---|---|---|---|
| 5,524,077 A | * | 6/1996 | Faaland | G05B 19/41865 705/7.21 |
| 7,292,960 B1 | * | 11/2007 | Srinivasa | G06Q 10/06 340/500 |
| 2014/0359634 A1 | * | 12/2014 | Arao | G06F 9/5011 718/104 |

OTHER PUBLICATIONS

"Genetic Algorithm", retrieved from https://en.wikipedia.org/wiki/Genetic_algorithm, on Dec. 28, 2015, 16 pages.

* cited by examiner

*Primary Examiner* — Dennis M Butler
(74) *Attorney, Agent, or Firm* — Brake Hughes Bellermann LLP

(57) ABSTRACT

A method of manufacturing at least a first product and a second product with at least a first machine and a second machine at minimum cost in an environment in which a cost of energy used by the first machine and the second machine varies as a function of time may include generating multiple chromosomes, determining fitness scores of each of the chromosomes, randomly generating, with probabilities based on the fitness scores, new chromosomes, determining fitness scores of the new chromosomes, selecting one of the new chromosomes with an optimal fitness score, and manufacturing at least the first product and the second product with at least the first machine and the second machine according to a schedule based on the selected new chromosome.

20 Claims, 13 Drawing Sheets

| | Job 402 | Due Time 404 | Task Sequence 406 | |
|---|---|---|---|---|
| Jobs 400 | 1 | 6 | 2(1) | 1(1) |
| | 2 | 6 | 1(2) | 2(2) |
FIG.4
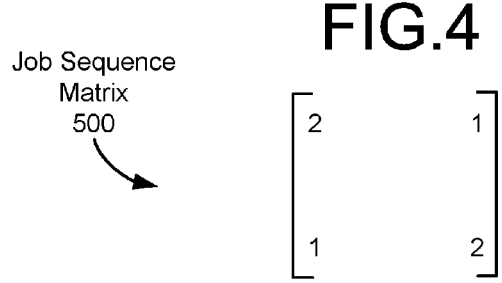
Job Sequence Matrix 500
FIG.5
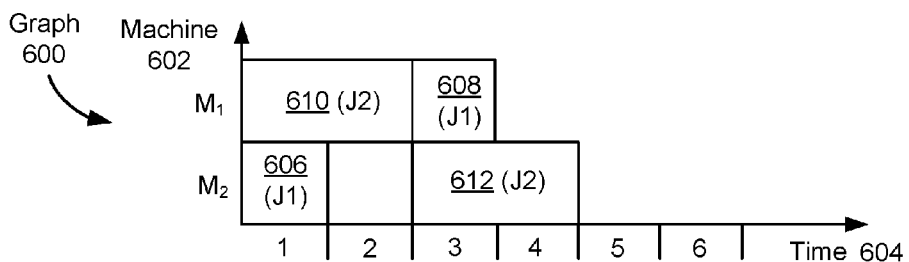
Graph 600
FIG.6
Energy cost table 700
| Time | 1 | 2 | 3 | 4 | 5 | 6 |
|---|---|---|---|---|---|---|
| Electricity tariff (cent/kWh) | 20 | 10 | 10 | 20 | 10 | 10 |
FIG.7

Task Sequence Table 1060

| Job 1062 | Due Time 1064 | Task Sequence 1066 | | |
|---|---|---|---|---|
| 1 | 10 | 3(1) | 2(2) | 1(1) |
| 2 | 10 | 3(1) | 2(2) | 1(1) |
| 3 | 10 | 1(3) | 2(2) | 3(3) |
| 4 | 10 | 3(1) | 1(1) | 2(1) |
| 5 | 10 | 2(2) | 3(2) | 1(2) |

FIG.10C

Job sequence matrix 1075

$$\begin{bmatrix} 2 & 5 & 4 & 1 & 2 \\ 1 & 3 & 2 & 5 & 4 \\ 3 & 1 & 5 & 4 & 3 \end{bmatrix}$$

FIG.10D

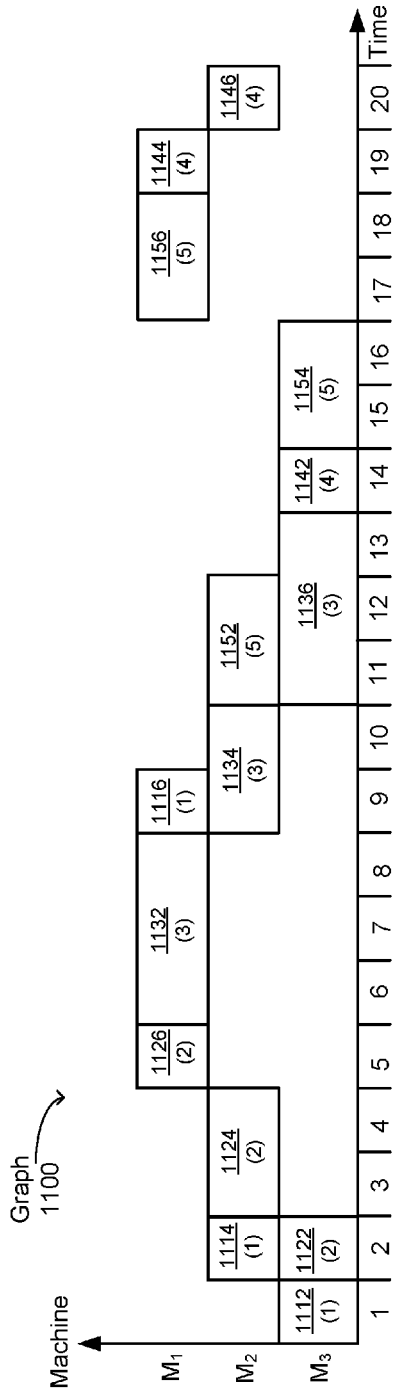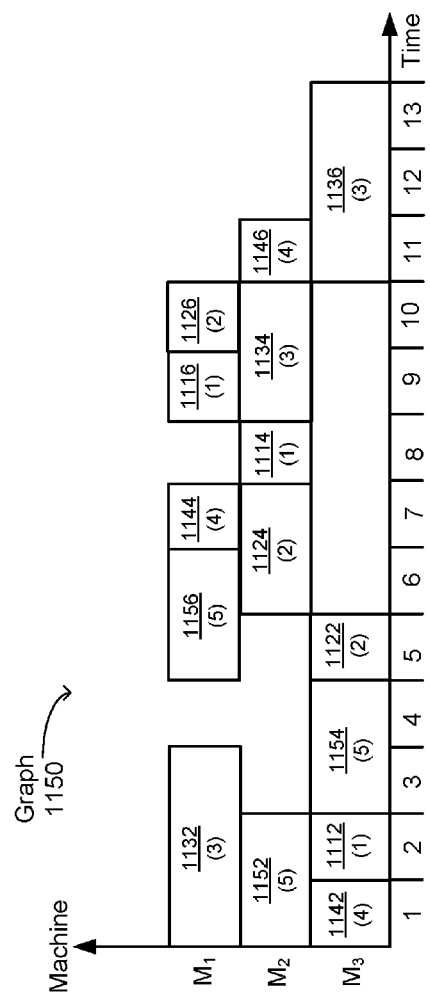

Job sequence matrix 1000

$$\begin{bmatrix} 2 & 3 & 1 & 5 & 4 \\ 1 & 2 & 3 & 5 & 4 \\ 1 & 2 & 3 & 4 & 5 \end{bmatrix}$$

FIG.12A

Job sequence matrix 1050

$$\begin{bmatrix} 3 & 5 & 4 & 1 & 2 \\ 5 & 2 & 1 & 3 & 4 \\ 4 & 1 & 5 & 2 & 3 \end{bmatrix}$$

FIG.12B

Job sequence matrix 1300

$$\begin{bmatrix} 2 & 3 & 5 & 4 & 1 \\ 2 & 1 & 3 & 5 & 4 \\ 1 & 2 & 3 & 4 & 5 \end{bmatrix}$$

FIG.13A

Job sequence matrix 1350

$$\begin{bmatrix} 3 & 1 & 5 & 4 & 2 \\ 5 & 1 & 2 & 3 & 4 \\ 4 & 1 & 5 & 2 & 3 \end{bmatrix}$$

FIG.13B

FIG.15A
FIG.15B
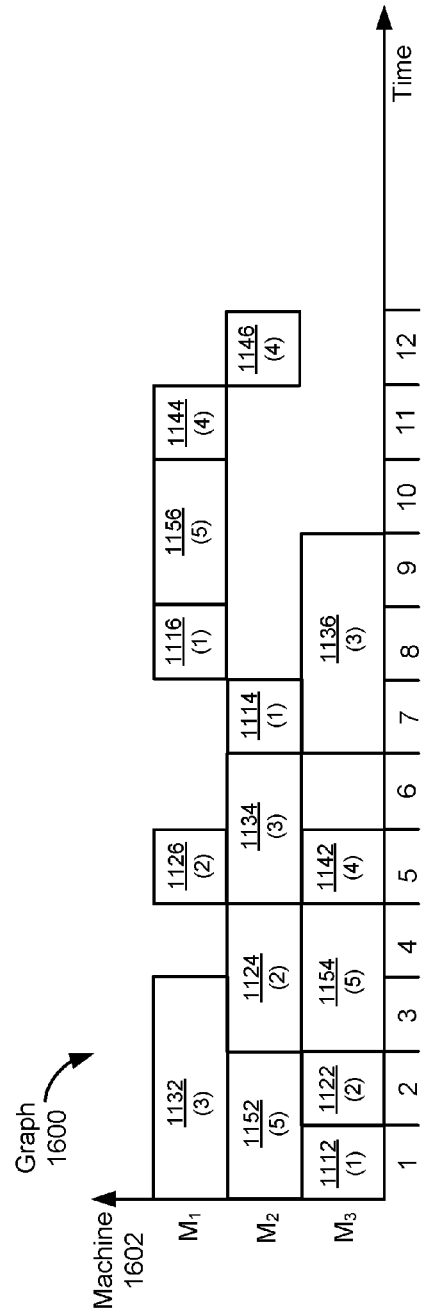
FIG.16

OPTIMIZING MANUFACTURING SCHEDULE WITH TIME-DEPENDENT ENERGY COST

TECHNICAL FIELD

This description relates to manufacturing products using energy-consuming machines.

BACKGROUND

Manufacturing may be energy-intensive, causing energy to be a large part of the expense of manufacturing products. The cost of energy may vary as a function of time, such as depending on the time of day. There may, for example, be peak-on times and peak-off times, where energy costs more during the peak-on times than during the peak-off times. The cost may also vary depending on the season, such as different costs during the winter than during the summer. The cost of energy may also vary based on total usage, such as a first cost for the first number of kilowatt hours in a time period, and then a second, more expensive, cost per kilowatt hour in the same time period.

Manufacturers may also have deadlines to meet for manufacturing products. Customers may impose penalties for not meeting deadlines. Manufacturers may consider tradeoffs between the penalties for not meeting deadlines and increased production costs for ramping up production during a time when the cost of energy is high. Manufacturers may also have to consider dependencies between manufacturing tasks, by which some tasks must be completed before other tasks.

SUMMARY

According to one general aspect, a method of manufacturing at least a first product and a second product with at least a first machine and a second machine at minimum cost in an environment in which a cost of energy used by the first machine and the second machine varies as a function of time may include generating multiple chromosomes, determining fitness scores of each of the chromosomes with job sequence matrices and idle time matrices, randomly generating, with probabilities based on the fitness scores, new chromosomes, determining fitness scores of the new chromosomes, selecting one of the new chromosomes with an optimal fitness score, and manufacturing at least the first product and the second product with at least the first machine and the second machine according to a schedule based on the selected new chromosome. Each chromosome may include a job sequence matrix describing an order of performing tasks to manufacture the first product and the second product using the first machine and the second machine, and an idle time matrix describing idle times before performing the tasks in the order described by the job sequence matrix. The fitness scores may be based on energy costs at the times that the first and second machines perform the tasks.

According to another general aspect, a non-transitory computer-readable storage medium may comprise instructions stored thereon for optimizing a schedule to manufacture at least a first product and a second product with at least a first machine and a second machine at minimum cost in an environment in which a cost of energy used by the first machine and the second machine varies as a function of time. The instructions, when executed by at least one processor, may be configured to cause a computing system to at least generate multiple chromosomes, determine fitness scores of each of the chromosomes with the job sequence matrices and the idle time matrices, randomly generate, with probabilities based on the fitness scores, new chromosomes based on the chromosomes with the idle time matrices, determine fitness scores of the new chromosomes, select one of the new chromosomes with an optimal fitness score, and present the schedule to manufacture at least the first product and the second product to a user in a graphical format, the schedule being based on the selected new chromosome. Each chromosome may include a job sequence matrix describing an order of performing tasks to manufacture the first product and the second product using the first machine and the second machine, and an idle time matrix describing idle times before performing the tasks in the order described by the job sequence matrix. The fitness scores may be based on energy costs at the times that the first and second machines perform the tasks.

A non-transitory computer-readable storage medium may comprise instructions stored thereon for optimizing a schedule to manufacture at least a first product and a second product with at least a first machine and a second machine at minimum cost in an environment in which a cost of energy used by the first machine and the second machine varies as a function of time, the first product is associated with a first deadline and a first penalty cost per unit time for manufacturing the first product after the deadline, and the second product is associated with a second deadline and a second penalty cost per unit time for manufacturing the second product after the second deadline. The instructions, when executed by at least one processor, may be configured to cause a computing system to at least generate multiple chromosomes, each chromosome including a job sequence matrix describing an order of performing tasks to manufacture the first product and the second product using the first machine and the second machine, and an idle time matrix describing idle times before performing the tasks in the order described by the job sequence matrix. The instructions may also be configured to cause the computing system to exchange a first sequence of tasks from a first job sequence matrix from a first chromosome with a second sequence of tasks from a second job sequence matrix from a second chromosome, the first sequence of tasks and the second sequence of tasks including a subset of tasks from a same set of tasks and being performed on a same machine with the tasks being performed in a different order. The instructions may also be configured to cause the computing system to swap, within at least one of the job sequence matrices, an order of performing at least a first task for manufacturing the first product on the first machine with a second task for manufacturing the second product on the first machine. The instructions may also be configured to cause the computing system to determine fitness scores of each of the chromosomes with the job sequence matrices and the idle time matrices, the fitness scores being based on a sum of energy costs at the times that the first and second machines perform the tasks according to the respective chromosomes and the penalty costs of manufacturing the first and second products after the associated deadlines. The instructions may also be configured to cause the computing system to randomly generate, with probabilities based on the fitness scores, new chromosomes based on the chromosomes with the idle time matrices. The instructions may also be configured to cause the computing system to determine fitness scores of the new chromosomes. The instructions may also be configured to cause the computing system to select one of the new chromosomes with an optimal fitness score. The instructions may also be configured to cause the computing system to present the schedule for manufacturing at least the first product and the second product to a user in a graphical format, the schedule being based on the selected new chromosome. The exchanging the first sequence of tasks, swapping the order of performing, determining fitness scores of each of the chromosomes, and randomly generating new chromosomes, may be included in a process that is performed multiple times.

The details of one or more implementations are set forth in the accompanying drawings and the description below. Other features will be apparent from the description and drawings, and from the claims.

BRIEF DESCRIPTION OF THE DRAWINGS

FIG. 4 is a table describing jobs according to an example implementation.

FIG. 5 is a job sequence matrix according to an example implementation.

FIG. 6 is a graph showing tasks performed according to the job sequence matrix of FIG. 5 according to an example implementation.

FIG. 7 is an energy cost table describing energy cost at different times according to an example implementation.

FIG. 10C is a task sequence table according to an example implementation.

FIG. 10D is a job sequence matrix according to an example implementation.

FIGS. 11A and 11B are graphs showing tasks performed according to the job sequence matrices of FIGS. 10A and 10B and the task sequence table of FIG. 10C according to an example implementation.

FIGS. 12A and 12B show the job sequence matrices of FIGS. 10A and 10B with task sequences that are candidates for crossing over highlighted.

FIGS. 13A and 13B are job sequence matrices after the tasks highlighted in FIGS. 12A and 12B have been crossed over according to an example implementation.

FIG. 15A shows the job sequence matrix of FIG. 10A with candidate tasks for swapping highlighted according to an example implementation.

FIG. 15B shows a job sequence matrix after the candidate tasks of FIG. 15A were swapped according to an example implementation.

FIG. 16 is a graph showing tasks performed according to the job sequence matrix of FIG. 15B and the task sequence table of FIG. 10C according to an example implementation.

DETAILED DESCRIPTION

The optimal schedule for tasks to be performed in manufacturing products may be solved by a genetic algorithm. The schedule may be represented as chromosomes, which are expressed as matrices. The chromosomes and matrices may be decoded into a graphical form, with idle time units added to avoid expensive energy usage.

After representing the schedule as chromosomes and decoding the chromosomes, an iterative procedure may optimize the schedule. The procedure may include initializing input parameters including a maximum number of iterations, a number of chromosomes, a crossover rate, and a mutation rate. The procedure may also include initializing a job sequence matrix for all the chromosomes. The procedure may also include incrementing a time value. The procedure may also include resetting an idle time matrix to a zero matrix. The procedure may also include updating the idle time matrix by an idle time insertion method. The procedure may also include selecting chromosomes with a roulette method. The procedure may also include crossing over chromosomes. The procedure may include randomly mutating chromosomes. Randomly mutated chromosomes may have their jobs randomly selected and changed for a given machine. The chromosomes may then have their fitness scores calculated. This procedure may be performed for the maximum number of iterations. This procedure may find a set of chromosomes with a maximum fitness value, thereby determining an optimal manufacturing schedule. The products may be manufactured according to the optimal manufacturing schedule to reduce energy costs.

Figure 1:
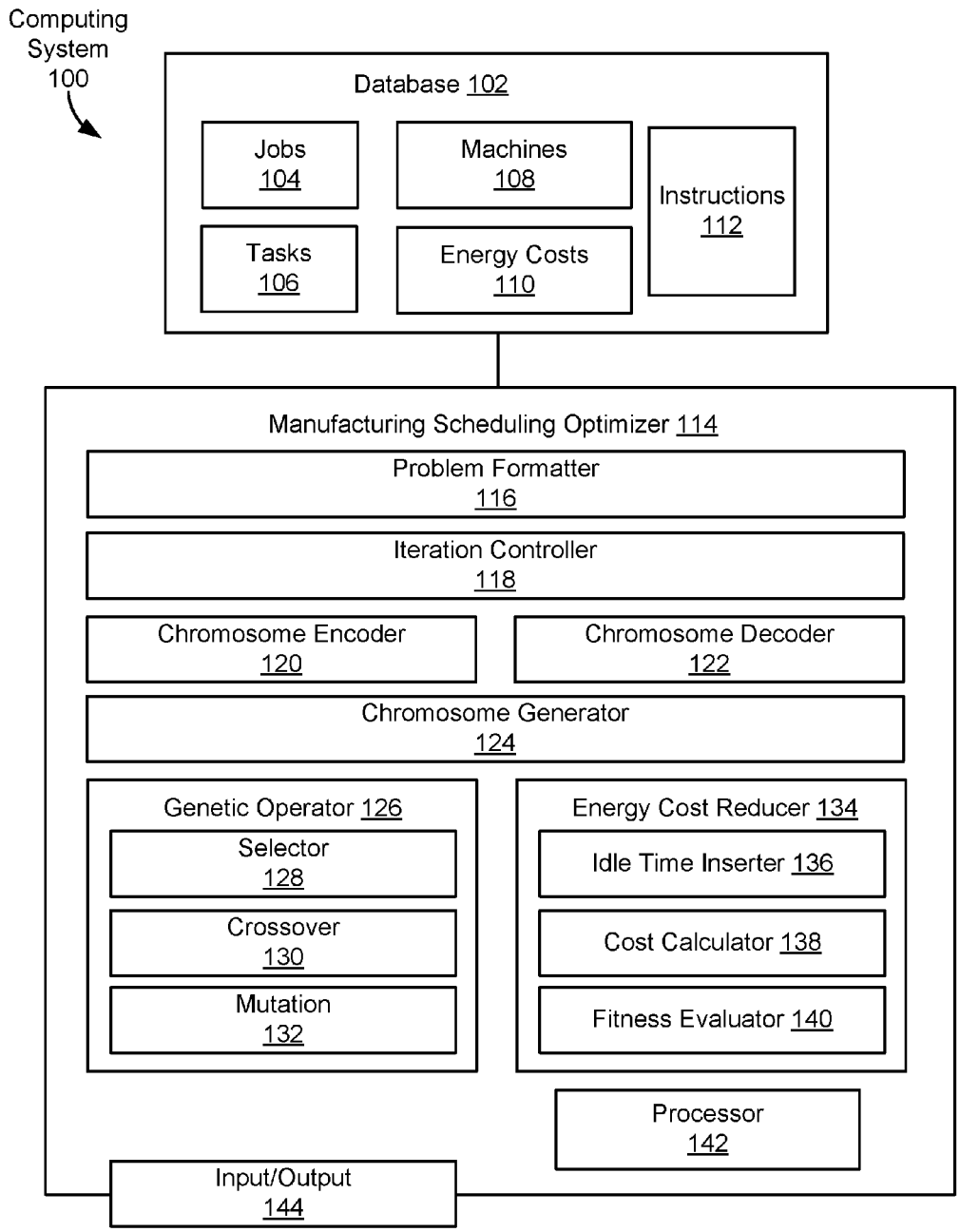
FIG. 1 is a diagram of a computing system for determining an optimal manufacturing schedule according to an example implementation.

FIG. 1 is a diagram of a computing system 100 for determining an optimal manufacturing schedule according to an example implementation. The computing system 100 may include a database 102 that stores input parameters used to optimize the schedule, a manufacturing scheduling optimizer 114 that optimizes the manufacturing schedule based on the input parameters, and input/output nodes 144 that receive input and output the optimized schedule.

The database 102 may include jobs 104. The jobs 104 may include sequences of tasks to produce and/or manufacture a specific product. The jobs may each have a due date or time, and a penalty cost for not manufacturing the product on or before the due time.

Figure 3A:
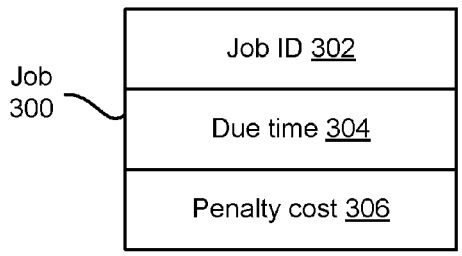
FIG. 3A is a table describing a job according to an example implementation.

FIG. 3A is a table describing a job 300 according to an example implementation. Multiple jobs 300 may be included in the database 102. In the example shown in FIG. 3A, the job 300 may include a job ID 302 identifying the job 300, a due time 304 indicating a date and/or time by which the job of manufacturing the product should be completed, and/or a penalty cost 306 indicating a cost, such as reduced payment or a fine, for not manufacturing the product by the due time 304. The penalty cost 306 may be measured by unit time, according to an example implementation.

Returning to FIG. 1, the database 102 may also include tasks 106. The tasks 106 may be steps or components of the jobs 104. Each job 104 may include one or multiple tasks 106, and each task 106 may be associated with a single job 104. Some tasks 106 may be performed only after another task 106 has been completed, and some tasks 106 may be completed either before or after another task 106 has been completed. A task 106 should be performed on a single machine, and may require a specific time to complete. A product may be manufactured after all the tasks 106 in the job 104 have been completed.

Figure 3B:
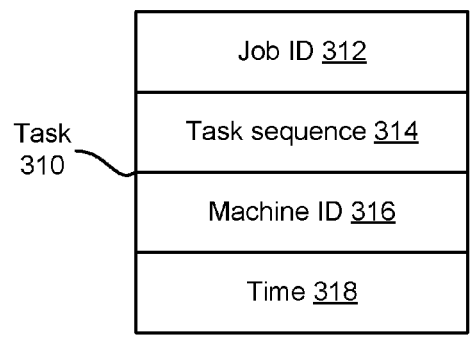
FIG. 3B is a table describing a task according to an example implementation.

FIG. 3B is a table describing a task 310 according to an example implementation. Multiple tasks 310 may be included in the database 102. The task 310 may include a job ID 312 indicating a job 300 that the task 310 is associated with, a task sequence 314 indicating a sequence number (such as first, second, or third) for the task 310, a machine ID 316 identifying a machine on which the task 310 must be performed (some tasks 310 may be performed on any machine, in which case the value of the machine ID 316 may be null), and a time 318 indicating a number of time units required to perform the task 310.

Returning to FIG. 1, the database 102 may include machines 108. The machines 108 may perform tasks to manufacture products.

Figure 3C:
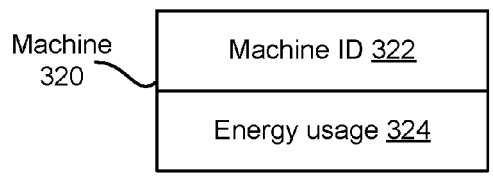
FIG. 3C is a table describing a machine according to an example implementation.

FIG. 3C is a table describing a machine 320 according to an example implementation. Multiple machines 320 may be included in the database 102. The machine 320 may include a machine ID 322 identifying the machine 320, and energy usage 324 indicating an amount of energy or power, such as kilowatt-hours, that the machine 320 uses per unit time that the machine 320 is performing a task.

Returning to FIG. 1, the database 102 may include energy costs 110. The energy costs 110 may include costs of energy per unit at specific times.

Figure 3D:
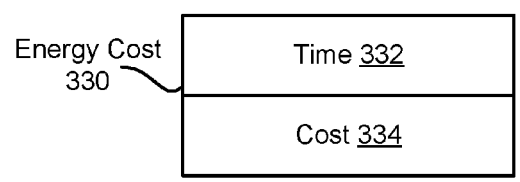
FIG. 3D is a table describing energy cost according to an example implementation.

FIG. 3D is a table describing energy cost 330 according to an example implementation. The energy cost 330 may include a time 332 identifying a time, such as a unit time number, and a cost 334, indicating a cost per unit time, such as dollars or cents per kilowatt-hour. The database 102 may include energy costs 330 for multiple times.

Returning to FIG. 1, the database 102 may also include instructions 112. The instructions 112 may be stored on a non-transitory computer-readable storage medium. The instructions 112, when executed by at least one processor 142, may be configured to cause the computing system 100 to perform any combination of one or more of the methods, functions, and/or techniques described herein.

The manufacturing scheduling optimizer 114 may determine an optimal schedule for manufacturing the products according to the jobs 104, tasks 106, machines 108, and/or energy costs 110. The manufacturing scheduling optimizer 114 may determine the optimal schedule that produces all of the products and/or completes all of the jobs 104 while minimizing total energy cost and/or minimizing a sum of total energy cost and penalties for finishing the jobs after associated deadlines. The manufacturing scheduling optimizer 114 may generate multiple possible schedules, which may be considered "chromosomes," and which may crossover portions of the schedules to each other, may mutate portions of the schedule, may determine fitness scores of the chromosomes based on energy costs and/or penalty costs, and may generate new chromosomes with probabilities based on the fitness scores, until selecting a chromosome with an optimal fitness score to represent the optimal schedule for manufacturing the products.

The manufacturing scheduling optimizer 114 may assume that all jobs can be finished in the limited time period, as expressed by $Max(\{F_i | i=1, 2, \ldots, N\}) \leq L$, where Fi is an actual finish time of job i, N is the number of jobs, and L is the number of time units in the limited time period. The manufacturing scheduling optimizer 114 may consider that for each job $J_i$, for $T_{im}$ and $T_{in}$ (Task i in job m or n), m<n, $Max(\{h | X_{ljkh}=1 \text{ and } l=i \text{ and } j=m\}) < Min(\{h | X_{ljkh}=1 \text{ and } l=i \text{ and } j=n\})$ (where h is the time unit, $X_{ljkh}$ is 1 if $T_{ij}$ is processed on $M_k$ at time unit $T_h$ and 0 otherwise), all tasks within a job should be finished in the sequence order. The manufacturing scheduling optimizer 114 may consider that at each unit time, one machine can process only one task of a job, and/or that two tasks or jobs cannot be processed simultaneously on the same machine: $\Sigma\Sigma X_{ijkh}=1$. The manufacturing scheduling optimizer 114 may also consider tasks to be atomic, meaning that they cannot be broken into parts and must be performed from beginning to end for the duration of the time to complete the task.

The manufacturing scheduling optimizer 114 may include a problem formatter 116. The problem formatter 116 may load data from the database 102, such as the jobs 104, tasks 106, machines 108, and/or energy costs 110, and format the data to optimize the manufacturing schedule.

The manufacturing scheduling optimizer 114 may include an iteration controller 118. The iteration controller 118 may control a number of iterations performed by the manufacturing scheduling optimizer 114 before selecting an optimal schedule. Each iteration may include generating chromosomes, crossing sequences of tasks over between chromosomes, mutating chromosomes, and/or generating new chromosomes. The iteration controller 118 may stop the iterations after a predetermined number of iterations, and/or stop the iterations after iterations improve a determined fitness score by less than, or no more than, a threshold value, according to example implementations.

The manufacturing scheduling optimizer 114 may include a chromosome encoder 120. The chromosome encoder 120 may encode chromosomes into a format, such as a matrix, in which operations, such as crossover and mutations, can be performed on the chromosomes. Crossovers may cross and/or exchange sequences of tasks between chromosomes. Mutations may exchange locations or orders of tasks within chromosomes. In an example implementation, a format into which the chromosomes are encoded may be a matrix. The chromosomes may be constrained by a number of jobs, tasks within the jobs and required sequences of the tasks, times required to perform each of the tasks, and a number of machines.

FIG. 4 is a table describing jobs 400 according to an example implementation. In this example, there are two jobs 402, job 1 and job 2. Each of the jobs has a due time 404 of six, meaning that the job must be completed within six time units to avoid a penalty cost.

In this example, the tasks for the jobs must be performed on particular machines. In this example, as shown in the task sequence, a first task for job 1 must be performed on machine 2 for one time unit, as indicated by the 2(1) in the task sequence 406, and a second task must be performed on machine 1 for one time unit, as indicated by the 1(1) in the task sequence 406. For job 2, a first task must be performed on machine 1 for two time units, as indicated by the 1(2) in the task sequence 406, and a second task must be performed on machine 2 for two time units, as indicated by the 2(2) in the task sequence 406.

FIG. 5 is a job sequence matrix 500 according to an example implementation. The chromosome encoder 120 may have constructed and/or encoded the job sequence matrix 500 based on the requirements of the jobs 402 and tasks indicated in FIG. 4. In this example, an upper row of the job sequence matrix 500 may indicate operations performed by the first machine (machine 1), and a lower row of the job sequence matrix 500 may indicate operations performed by the second machine (machine 2). As shown in the upper or first row, the first machine may first perform a task from job 2, and then perform a task from job 1. As shown in the lower or second row, the second machine may first perform a task from job 1, and then perform a task from job 2.

Returning to FIG. 1, the manufacturing scheduling optimizer 114 may include a chromosome decoder 122. The chromosome decoder 122 may convert matrices, such as the job sequence matrix 500, into a schedule. The schedule may be in a graphical format that is readable by humans.

FIG. 6 is a graph 600 showing tasks performed according to the job sequence matrix 500 of FIG. 5 according to an example implementation. In this example, a vertical axis indicates a machine 602 performing a task, and a horizontal axis indicates a time 604 at which tasks are performed.

In this example, a first task 606 from job 1 is performed by machine 2 during time unit 1, and a second task 608 from job 2 is performed by machine 1 during time unit 3, after machine 1 is finished completing a first task 610 from job 2. Also in this example, the first task 610 from job 2 is performed by machine 1 during time units 1 and 2, and a second task 612 from job 2 is performed by machine 2 during time units 3 and 4, after the first task 610 from job 2 has been completed by machine 1.

Returning to FIG. 1, the manufacturing scheduling optimizer 114 may include a chromosome generator 124. The chromosome generator 124 may generate chromosomes. The chromosomes may specify when tasks will be performed, and which machines will perform the tasks. The chromosomes may include job sequence matrices, such as the job sequence matrix 500 shown and described with respect to FIG. 5, and idle time matrices. Idle time matrices may specify times at which the machines will be idle. The idle times may reduce energy costs by idling the machines during times at which energy is more expensive. The chromosome generator 124 may randomly generate the job sequence matrices within the constraints of the number of jobs, tasks within the jobs, times for each task, and dependencies within tasks, and may optimize the idle time matrices for each job sequence matrix based on energy costs at each time unit.

FIG. 7 is an energy cost table 700 describing energy cost at different times according to an example implementation. The energy cost table 700 shows time 702, and energy cost at each time unit, which may be considered an electricity tariff 704 measured in cents per kilowatt-hour. In this example, the cost at time units one and four is twenty, double the cost of ten at time units two, three, five, and six.

Returning to FIG. 1, the manufacturing scheduling optimizer 114 may include an energy cost reducer 134. The energy cost reducer 134 may reduce the cost of energy for completing jobs by causing the machines to be idle at certain times, such as times at which energy costs are high.

The energy cost reducer 134 may include an idle time inserter 136. The idle time inserter 136 may insert idle times into the schedule. The idle times may cause the machines to idle and stop performing work. The idle times may be described by an idle time matrix.

Figures 8, 9, 10A, 10B:
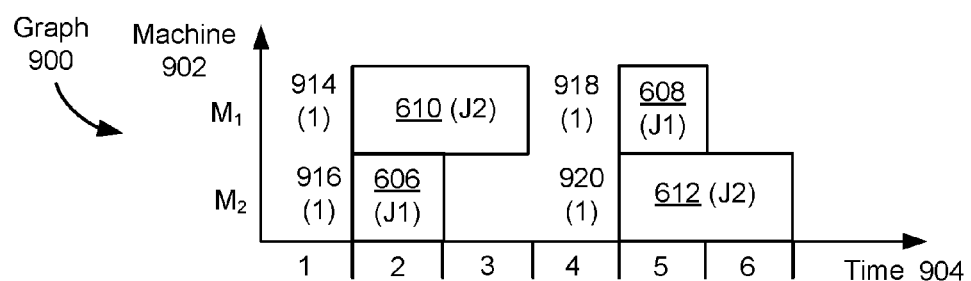
FIG. 8 is an idle time matrix according to an example implementation.
FIG. 9 is a graph showing tasks performed according to the job sequence matrix of FIG. 5 and the idle time matrix of FIG. 8 according to an example implementation.
FIGS. 10A and 10B are job sequence matrices according to an example implementation.

FIG. 8 is an idle time matrix 800 according to an example implementation. The idle time matrix 800 may include idle times inserted before tasks described by the job sequence matrix 500 shown and described with respect to FIG. 5. In this example, the upper or first row shows that machine 1 will be idle for one time unit before performing the first task (of the second job), and will be idle for one time unit before performing the second task (of the first job). Also in this example, the lower or second row shows that machine 2 will be idle for one time unit before performing the first task (of the first job), and will be idle for one time unit before performing the second task (of the second job). The chromosome decoder 122 may decode the job sequence matrix 500 and idle time matrix 800 to generate a graph showing a schedule of performing the tasks.

FIG. 9 is a graph showing tasks performed according to the job sequence 500 matrix of FIG. 5 and the idle time matrix 800 of FIG. 8 according to an example implementation. A vertical axis may indicate a machine 902 performing a task, and a horizontal axis may indicate a time 904 at which tasks are performed.

In this example, machine 1 may have an idle time 914 at time unit 1, may perform the first task 610 for job 2 during time units two and three, may have an idle time 918 at time unit 4, and may perform the second task 608 for job 1 during time unit 5. Also in this example, machine 2 may have an idle time 916 at time unit 1, may perform the first task 606 for job 1 during time unit two, may have an idle time 920 during time unit four, and may perform the second task 612 for job 2 during time units five and six.

Returning to FIG. 1, the energy cost reducer 134 may include a cost calculator 138. The cost calculator 138 may calculate a cost of performing the tasks according to a schedule with a given set of energy costs. The cost calculator 138 may calculate costs before and after idle times are inserted. In an example with N jobs which each consist of M tasks, M machines, and L unit times, an objective function can be expressed as the following formula which minimizes the sum of the energy cost and delay penalty:

$$\text{Minimize} \left( \sum_{i=1}^{N} \sum_{j=1}^{M} \sum_{k=1}^{M} \sum_{h=1}^{L} X_{ijkh} E_k C_h + \sum_{i=1}^{N} \text{Max}(0, (F_i - D_i) P_i) \right)$$

where the first summation is the total energy cost and the second summation is the delay penalty, with N being the number of jobs, M being the number of tasks for a given job, L being the total time, $X_{ijkh}$ is 1 if $T_{ij}$ is processed on $M_k$ at time unit $T_h$ and 0 otherwise, $E_k$ being energy usage in unit time of machine k if the machine is processing the task, $C_h$ being an energy tariff in unit time h, $F_i$ being an actual finish time of job i, $D_i$ being a deadline of job I, and $P_i$ being a penalty cost of job i in unit times for completing the job after the deadline.

In the example graph 600 of FIG. 6 (with no idle times inserted) and the energy cost table 700 of FIG. 7, two tasks are performed during time unit 1 for a cost of 2*20=40, one task is performed during time unit 2 for a cost of 1*10=10, two tasks are performed during time unit three for a cost of 2*10=20, and one task is performed during time unit 4 for a cost of 1*20=20, for a total cost of 90. In this example graph 900 of FIG. 9 (with idle times inserted) and the energy cost table 700 of FIG. 7, no tasks are performed during time unit 1 for a cost of 0*20=0, two tasks are performed during time unit two for a cost of 2*10=20, one task is performed during time unit 3 for a cost of 1*10=10, no tasks are performed during time unit 4 for a cost of 0*20=0, two tasks are performed during time unit 5 for a cost of 2*10=20, and one task is performed during time unit 6 for a cost of 1*10=10, for a total cost of 60, and a cost savings of 10 compared to when no idle times were inserted. In both of the examples of FIG. 6 and FIG. 9, the due time of 6 is not exceeded, so no delay penalty is added.

Returning to FIG. 1, the energy cost reducer 134 may include a fitness evaluator 140. The fitness evaluator 140 may determine the fitness scores of chromosomes with and without idle times, and may determine an optimal idle time matrix for a given job sequence matrix. In the example described above with respect to FIGS. 6, 7, and 9, the cost without idle times inserted is 70, whereas the cost with the idle times inserted is 60, resulting in a higher fitness score with the idle times inserted.

The manufacturing scheduling optimizer 114 may include a genetic operator 126. The genetic operator 126 may modify the chromosomes, including the job sequence matrices and/or idle time matrices, at each iteration, as the manufacturing scheduling optimizer iteratively progresses toward an optimal manufacturing schedule.

The genetic operator 126 may include a selector 128. The selector 128 may select chromosomes from a previous generation and/or iteration. The selector 128 may randomly select chromosomes from the previous iteration with probabilities based on their fitness scores. The selector 128 may, for example, select chromosomes that have lower costs with a higher probability than chromosomes with higher costs. The genetic operator 126 may perform crossover and/or mutation on the selected chromosomes during the iteration in which the chromosomes were selected.

The genetic operator 126 may include a crossover engine 130. The crossover engine 130 may cross and/or exchange sequences of tasks from an idle time matrix in a first chromosome to an idle time matrix in a second chromosome. The sequences of tasks may be performed by the same machine in both chromosomes between which the sequences of tasks are crossed over. FIGS. 10-16 show job sequence matrices and graphs before and after task sequences are crossed over or mutated. In the graphs, the numbers in parentheses denote the job number of which the tasks are components.

FIGS. 10A and 10B are job sequence matrices 1000, 1050 according to an example implementation. In this example, the job sequence matrices 1000, 1050 describe an order of performing tasks with three machines and five jobs. In this example, each job includes three tasks. In this example, within each job, each task after the first task must be performed after the preceding task, and each task must be performed on a specific machine.

FIG. 10C is a task sequence table 1060 according to an example implementation. In this example, the task sequence table 1060 includes job identifiers 1062 identifying five jobs, a due time 1064 indicating a due time for each job, and a task sequence 1066 indicating, for each job, tasks to be performed, the machine on which the tasks are to be performed and, in parentheses, the number of time units required to perform each task. In this example, for job 1, a first task must be performed on machine 3 and takes one time unit, a second task must be performed on machine 2 and takes two time units, and a third task must be performed on machine 1 and takes one time unit.

FIG. 10D is a job sequence matrix 1075 according to an example implementation. The job sequence matrix 1075 is an invalid job sequence as applied to the task sequence table 1060 because none of the jobs can begin according to the combination of sequences required by the task sequence table 1060 and the job sequence matrix 1075.

According to the job sequence matrix 1075, machine 1 should start with a task from job 2, but according to the task sequence table 1060, the first task of job 2 should be performed by machine 3, so machine 1 cannot begin performing any jobs. According to the job sequence matrix 1075, machine 2 should start with a task from job 1, but according to the task sequence table 1060, the first task of job 1 should be performed by machine 3, so machine 2 cannot begin performing any jobs. According to the job sequence matrix 1075, machine 3 should start with a task from job 3, but according to the task sequence table 1060, the first task of job 3 should be performed by machine 1, so machine 3 cannot begin performing any jobs.

Because none of the machines can begin working with the combination of task sequence table 1060 and job sequence matrix 1075, the machines and/or jobs deadlock, and the combination of task sequence table 1060 and job sequence matrix 1075 results in an invalid job sequence matrix. The machines may also deadlock if one or more of the machines begin working but a deadlock later prevents all of the tasks of the jobs from being completed. If a job sequence matrix, such as the job sequence matrix 1075, is invalid, the chromosome generator 124 may discard the invalid job sequence matrix and generate a new job sequence matrix until generating a valid job sequence matrix.

FIGS. 11A and 11B are graphs 1100, 1150 showing tasks performed according to the job sequence matrices 1000, 1050 of FIGS. 10A and 10B and the task sequence table 1060 of FIG. 10C according to an example implementation. The tasks are also performed within the constraints of the task sequence table 1060. Graph 1100 shows the tasks performed according to the job sequence matrix 1000, and graph 1150 shows the tasks performed according to the job sequence matrix 1050.

As shown in FIG. 11A, according to the job sequence matrix 1000, machine 1 performs task 1126 of job 2 for one time unit, task 1132 of job 3 for three time units, task 1116 of job 1 for one time unit, task 1156 of job 5 for two time units, and then task 1144 of job 4 for one time unit. Machine 1 cannot perform task 1126 until time unit 5 because machine 1 must wait until machine 2 has completed task 1124 of job 2. Machine 1 cannot perform task 1156 of job 5 until time unit 17 because machine 1 must wait until machine 3 has completed task 1154 of job 5.

Also as shown in FIG. 11A, machine 2 performs task 1114 of job 1 for one time unit, task 1124 of job 2 for two time units, task 1134 of job 3 for two time units, task 1152 of job 5 for two time units, and then task 1146 of job 4 for one time unit. Machine 2 cannot perform task 1134 until time unit 9 because machine 2 must wait for machine 1 to complete task 1132.

Also as shown in FIG. 11A, machine 3 performs task 1112 of job 1 for one time unit, task 1122 of job 2 for one time unit, task 1136 of job 3 for three time units, task 1142 of job 4 for one time unit, and then task 1154 of job 5 for two time units. Machine 3 cannot perform task 1136 until time unit 11 because machine 3 must wait until machine 2 has completed task 1134. As shown in FIG. 11A, job 1 is completed after time 9, before the due time of 10, job 2 is completed after time 5, before the due time of 10, job 3 is completed after time 13, three time units after the due time of 10, job 4 is completed after time 20, ten time units after the due time of 10, and job 5 is completed after time 18, eight time units after the due time of 10, for a total delay penalty of twenty-one if the delay penalty or cost per unit time is one.

In the example of FIG. 11B, the machines perform the same tasks as in the example of FIG. 11A. The jobs include the tasks in the same sequences and on the same machines as in FIG. 11B, based on the task sequence table 1060. However, each machine performs the tasks in a different order than the example of FIG. 11A. In this example, machine 1 performs task 1132 of job 3, task 1156 of job 5, task 1144 of job 4, task 1116 of job 1, and then task 1126 of job 2. Machine 1 cannot perform task 1156 until time 5 because machine 1 must wait for machine 3 to complete task 1154, and cannot perform task 1116 until time 9 because machine 1 must wait for machine 2 to complete task 1114.

Also in this example, machine 2 performs task 1152 of job 5, task 1124 of job 2, task 1114 of job 1, task 1134 of job 3, and then task 1146 of job 4. Machine 2 cannot perform task 1124 until time 6 because machine 2 must wait for machine 3 to complete task 1122.

Also in this example, machine 3 performs task 1142 of job 4, task 1112 of job 1, task 1154 of job 5, task 1122 of job 2, and then task 1136 of job 3. Machine 3 cannot perform task 1136 until time 11 because machine 3 must wait until machine 2 has completed task 1134. In this example, job 1 is completed after time 9, before the due time of 10, job 2 is completed at time 10, by the due time of 10, job 3 is completed after time 13, three time units after the due time of 10, job 4 is completed after time 11, one time unit after the due time of 10, and job 5 is completed after time 6, before the due time of 10, for a total delay penalty of four if the delay penalty or cost per time unit is one.

Returning to FIG. 1, the crossover engine 130 may select task sequences as candidates for crossing over between job sequence matrices. The task sequences to be crossed over must be performed by a same machine, and must include the same tasks. A predetermined probability for crossing over candidate job sequences may have previously been entered by a user or administrator of the computing system 100.

FIGS. 12A and 12B show the job sequence matrices 1000, 1050 of FIGS. 10A and 10B with task sequences that are candidates for crossing over highlighted. In this example, the crossover engine 130 has selected the task sequence of tasks for jobs 1, 5, and 4 performed by machine 1 on the job sequence matrix 1000 and the task sequence of tasks for jobs 5, 4, and 1 performed by machine 1 on the job sequence matrix 1050 as candidates for crossing over. Also in this example, the crossover engine has selected the task sequence of tasks for jobs 1, 2, and 3 performed by machine 2 on the job sequence matrix 1000 and the task sequence of tasks for jobs 2, 1, and 3 performed by machine 2 on the job sequence matrix 1050 as candidates for crossing over.

FIGS. 13A and 13B are job sequence matrices 1300, 1350 after the tasks highlighted in FIGS. 12A and 12B have been crossed over according to an example implementation. In this example, the sequence of tasks performed by machine 1 according to job sequence matrix 1300 has been changed from jobs 2, 3, 1, 5, and then 4 in job sequence 1000 to jobs 2, 3, 5, 4, and then 1 in job sequence matrix 1300. Also in this example, the sequence of tasks performed by machine 2 according to job sequence matrix 1300 has been changed from jobs 1, 2, 3, 5, and then 4 in job sequence 1000 to jobs 2, 1, 3, 5, and then 4 in job sequence 1300.

In this example, the sequence of tasks performed by machine 1 according to job sequence matrix 1350 has been changed from jobs 3, 5, 4, 1, and then 2 in job sequence 1050 to jobs 3, 1, 5, 4, and then 2 in job sequence matrix 1350. Also in this example, the sequence of tasks performed by machine 2 according to job sequence matrix 1350 has been changed from jobs 5, 2, 1, 3, and then 4 to jobs 5, 1, 2, 3, and then 4 in job sequence matrix 1350.

Figure 14A:
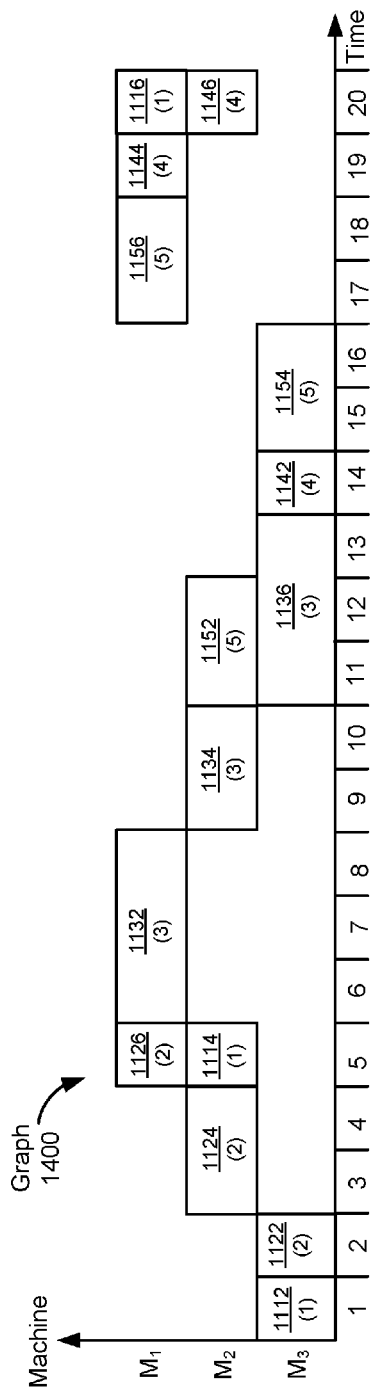
FIGS. 14A and 14B are graphs showing tasks performed according to the job sequence matrices of FIGS. 13A and 13B and the task sequence table of FIG. 10C according to an example implementation.
Figure 14B:
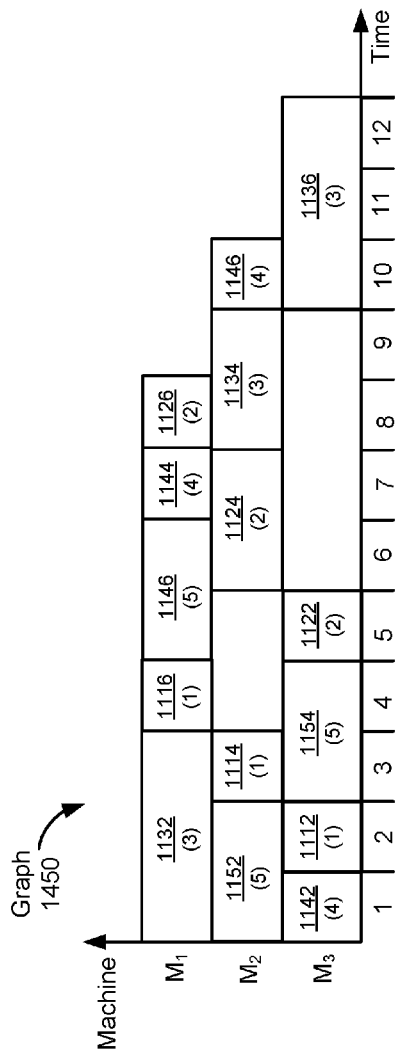

FIGS. 14A and 14B are graphs showing tasks performed according to the job sequence matrices 1300, 1350 of FIGS. 13A and 13B and the task sequence table 1060 of FIG. 10C according to an example implementation. In this example, the swapping of the task sequences has caused the jobs of job sequence matrix 1300 to increase the total delay penalty from twenty-one to thirty-one (ten for job 1, zero for job 2, three for job 3, ten for job 4, plus eight for job 5), but has decreased the penalty cost in job matrix sequence 1350 to two (zero for job 1, zero for job 2, two for job 3, zero for job 4, and zero for job 5) from four in job sequence matrix 1050.

Returning to FIG. 1, the genetic operator 126 may include a mutation engine 132. The mutation engine 132 may perform mutations of the job sequence matrices. The mutation engine 132 may perform mutations of the jobs sequence matrices by selecting two (or more) tasks performed by same machine as candidates for swapping within the same matrix. The candidate tasks may be randomly selected by the mutation engine 132. The mutation engine may swap the candidate tasks with a probability that may have been previously entered by a user or administrator of the computing system 100.

FIG. 15A shows the job sequence matrix 1000 of FIG. 10A with candidate tasks for swapping highlighted according to an example implementation. The swapping of an order of tasks performed by a same machine within a same job sequence matrix may be considered a mutation of the chromosome.

In this example, for machine 1, the mutation engine 132 may have selected the first and second tasks, associated with jobs 2 and 3, respectively; for machine 2, the mutation engine 132 may have selected the first and fourth tasks, associated with jobs 1 and 5, respectively; and for machine 3, the mutation engine 132 may have selected the third and fifth tasks, associated with jobs 3 and 5, respectively, as candidates for swapping.

FIG. 15B shows a job sequence matrix 1500 after the candidate tasks of FIG. 15A were swapped according to an example implementation. In this example, all of the candidate tasks were swapped. In this example, machine 1 will perform tasks for jobs 2, 4, 5, 1, and then 3, machine 2 will perform tasks for jobs 2, 3, 1, 5, and then 4, and machine 3 will perform tasks for jobs 5, 3, 4, 2, and then 1.

FIG. 16 is a graph showing tasks performed according to the job sequence matrix 1500 of FIG. 15B and the task sequence table 1060 of FIG. 10C according to an example implementation. As shown in this example, the mutating of jobs sequence matrix 1000 by swapping of tasks has decreased the delay penalty for job sequence matrix 1500 to two (zero for job 1, zero for job 2, zero for job 3, two for job 4, plus zero for job 5) from the delay penalty of twenty-one in job sequence matrix 1000.

Returning to FIG. 1, the computing system 100 may include at least one processor 142. The at least one processor 142 may be configured to execute instructions, such as the instructions 112 stored in the database 102, to cause the computing system 100 to perform any combination of one or more of the functions, methods, and/or techniques described herein.

The computing system 100 may also include one or more input/output nodes 144. The one or more input/output nodes 144 may include any combination of input and output devices, such as human interface devices to receive input from a user, input devices to receive input from other computing systems, output devices to provide output to a user such as a display, speaker, and/or printer, and/or output devices to provide output to other computing systems. The input/output nodes 144 may also output the optimized manufacturing schedule.

Figure 17:
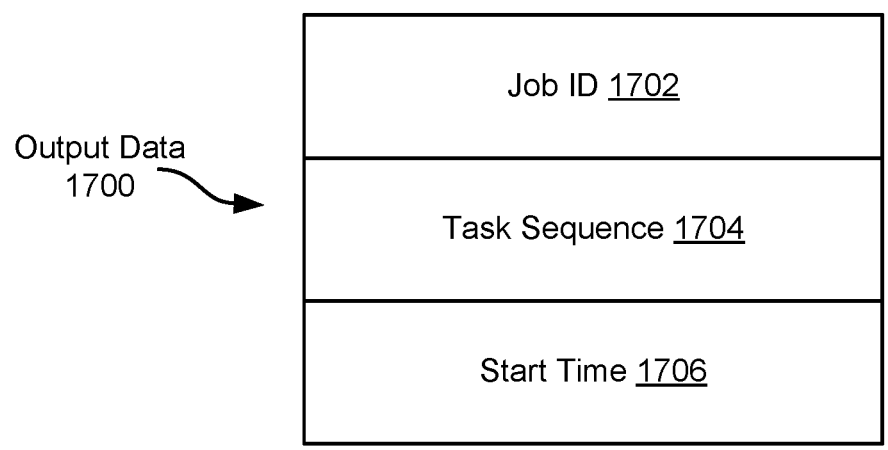
FIG. 17 is a table showing output data according to an example implementation.

FIG. 17 is a table showing output data 1700 according to an example implementation. The output data 1700 may describe a schedule for manufacturing the products according to the inputs of jobs 104, tasks 106, machines 108, and/or energy costs 110. The output data 1700 may include a job ID 1702 identifying a job, a task sequence 1704 indicating a sequence of tasks within the identified job, and a start time indicating state times for the tasks. The output data 1700 may include tasks and start times for multiple jobs.

Figure 2:
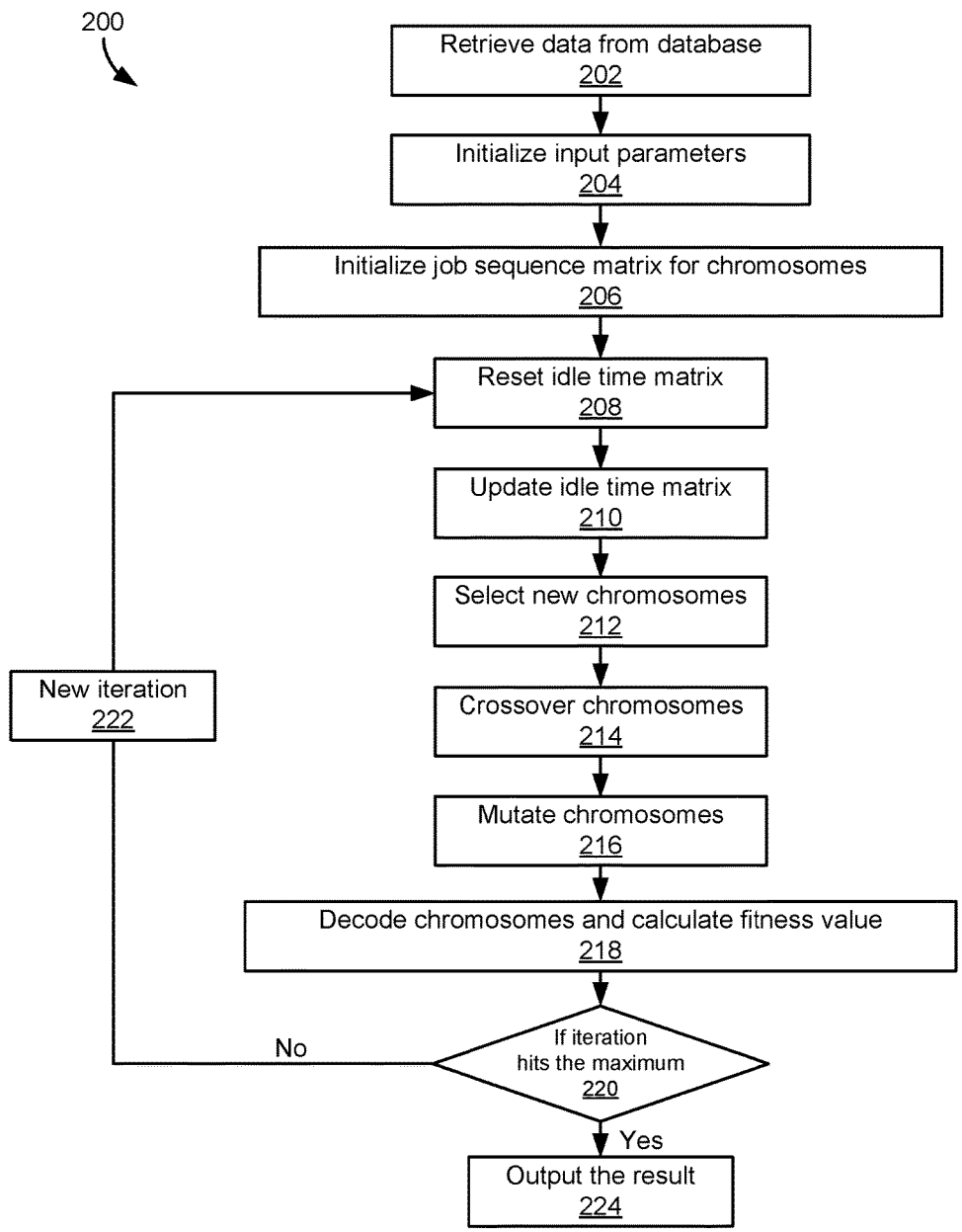
FIG. 2 is a flowchart of a method for determining an optimal manufacturing schedule according to an example implementation.

FIG. 2 is a flowchart of a method 200 for determining an optimal manufacturing schedule according to an example implementation. The method 200 may be performed by the manufacturing scheduling optimizer 114.

The method 200 may include retrieving data from a database (202). The manufacturing scheduling optimizer 114 may, for example, retrieve the jobs 104, tasks 106, machines 108, and/or energy costs 110 from the database 102.

The method 200 may include initializing the input parameters (204). The manufacturing scheduling optimizer 114 may initialize input parameters by, for example, setting a number of chromosomes to generate, setting a probability for crossing over task sequences between job sequence matrices within chromosomes, and/or setting a probability of mutating chromosomes by swapping tasks performed by a machine within a same job sequence matrix.

The method 200 may include initializing a job sequence matrix for each of the chromosomes (206). The chromosome generator 124 of the manufacturing scheduling optimizer 114 may initialize the job sequence matrices by randomly placing tasks from the jobs into locations on the job sequence matrices. The manufacturing scheduling optimizer 114 may also calculate fitness scores for each of the initialized job sequence matrices without idle times inserted. The manufacturing scheduling optimizer 114 may calculate the fitness scores for each of the initialized job sequence matrices based on the total energy costs and/or any delay penalties for not meeting deadlines.

The chromosome generator 124 may check the validity of generated job sequence matrices. The chromosome generator 124 may check the validity of generated job sequence matrices by generating a graph using the job sequence matrix and the task sequence table. If all the tasks can be completed, as in the job sequence matrices 1000, 1050 of FIGS. 10A and 10B, then the job sequence matrix may be considered valid. If one or more tasks cannot be completed, and/or one or more tasks or machines deadlock, as in the example job sequence matrix 1075 of FIG. 10D, then the chromosome generator 124 may discard and/or drop the invalid job sequence matrix and initialize and/or generate a new job sequence matrix until generating a valid job sequence matrix.

The method 200 may include resetting idle time matrices from each chromosome (208). The manufacturing scheduling optimizer 114 may reset the idle time matrices by setting the idle time matrices to a zero matrix.

The method 200 may include updating the idle matrices from each chromosome (210). The manufacturing scheduling optimizer 114 may update the idle time matrices by randomly and/or iteratively inserting values, such as one (1) values, into the idle time matrices. The manufacturing scheduling optimizer 114 may, for example, try inserting one values into each location of the idle time matrix, and determine whether inserting a one value reduces the cost and/or increases the fitness score of the chromosome. If no insertions of one values into the idle time matrix improve the cost and/or fitness score, then the manufacturing scheduling optimizer 114 may stop updating the idle time matrix. If an insertion does improve the cost and/or fitness score, then the manufacturing scheduling optimizer 114 may continue inserting one values into the idle time matrix, with probabilities at locations within the matrices based on previous improvements by inserting ones at those locations, until insertions no longer improve the cost and/or fitness score.

In an example implementation, the manufacturing scheduling optimizer 114 and/or idle time inserter 136 may insert idle times according to the following method:

a) For each $b_{ij}$ in $S_2$, calculate $Fit_{ij}$
b) $\Delta Fit_{ij} = Max(0, Fit_{ij} - Fit)$
c) If all $\Delta Fit_{ij} \leq 0$, save the current Fit and $S_2$, break the loop. Otherwise go to d)
d) Select the position row i and column j in $S_2$ to insert an idle time unit according to the following formula and add 1 to $b_{ij}$ after the selection $$P_{ij} = \frac{\Delta Fit_{ij}}{\sum_{i=1}^{M} \sum_{j=1}^{N} \Delta Fit_{ij}}$$

e) Set new Fit to the selected $Fit_{ij}$ and go to a)
where $Fit_{ij}$ is a fitness value of the chromosome for each $b_{ij}$ in the idle time matrix.

The method 200 may include selecting new chromosomes (212). The selector 128 may select new chromosomes by copying the previous chromosomes with probabilities based on their fitness scores and/or costs. The selector 128 may make multiple copies of chromosomes with high fitness scores and/or low costs, and may discard chromosomes with low fitness scores and/or high costs. The new chromosomes may be selected using a roulette method according to the following formula:

$$P_i = 1 - \frac{Fit_i}{\sum_{i=1}^{Nc} Fit_i}$$

The method 200 may include crossing over chromosomes (214). The crossover engine 130 may cross sequences of tasks between job sequence matrices, as discussed above with respect to FIGS. 11-14, changing the job sequences to create chromosomes that are not identical to any previous chromosome.

In an example implementation, the crossover engine 130 may randomly select chromosomes with a predetermined probability as crossover candidate chromosomes and include the crossover candidate chromosomes into a set. The crossover candidate chromosomes in the set may be randomly ordered. The crossover engine 130 may crossover task sequences of adjacent chromosomes. After the crossing over, the crossover engine 130 may check the validity of the chromosomes, as discussed above with respect to (206). If both chromosomes are valid, then the crossover engine 130 may remove both chromosomes from the set. If either chromosome is invalid, then the crossover engine 130 may cross the invalid chromosome with a subsequent chromosome in the set. If the chromosome is still invalid, then the crossover engine may cross the invalid chromosome with subsequent chromosomes until making a valid crossover. If the chromosome cannot validly cross over with any other chromosome, then the crossover engine 130 may remove the chromosome from the set without crossing the chromosome over with any other chromosome. This crossing over and checking validity may be performed on all the candidate crossover chromosomes in the set.

The method 200 may include mutating chromosomes (216). The mutation engine 132 may mutate job sequence matrices by swapping locations of tasks within the job sequence matrices, as described above with respect to FIGS. 15-16, changing the job sequence matrices to create chromosomes that are not identical to any previous chromosome.

The mutation engine 132 may also check the validity of the chromosome after mutating the chromosome. If the chromosome is valid after the mutation, then the chromosome may be kept and the method 200 may continue. If the chromosome is invalid after the mutation, then the mutation engine 132 may continue mutating the chromosome until the chromosome is valid.

The method 200 may include decoding the chromosomes and calculating fitness values (218). The chromosome decoder 122 may decode the chromosomes to generate graphs, such as the graphs shown in FIGS. 6, 9, 11A, 11B, 14A, 14B, and 16. The fitness evaluator 140 may determine the fitness of each chromosome based on a sum of the energy cost and any delay penalty.

The method may include determining whether a number of iterations has hit a maximum (220). The iteration controller 118 may determine whether the number of iterations has hit the maximum by comparing a number of iterations the method 200 has performed to a maximum number of iterations, and/or by comparing an improvement in the fitness score from a previous iteration to an improvement threshold. If the number of iterations has not met the maximum number, and/or if the improvement in the fitness score is greater than the improvement threshold, then the method may include performing a new iteration (222) of 208, 210, 212, 214, 216, 218, and 220.

If the number of iterations has met the met the maximum number, and/or if the improvement in the fitness score is no greater than the improvement threshold, then the method 200 may include outputting the result (224). The input/output module 144 may output the result by presenting and/or sending a schedule for manufacturing the products, including times and/or machines for performing each task in each job. The machines may manufacture the products according to the schedule.

Figure 18:
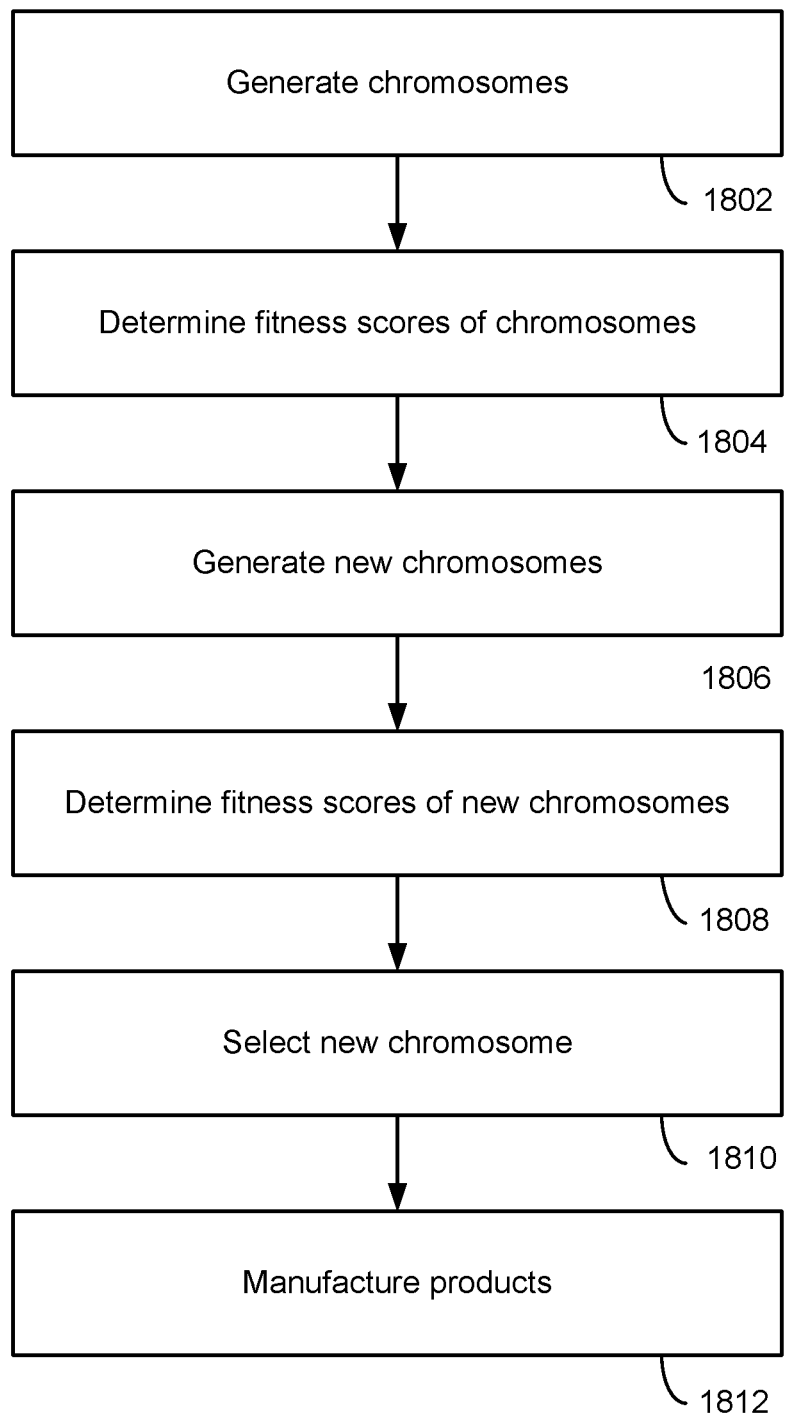
FIG. 18 is a flowchart showing a method according to an example implementation.

FIG. 18 is a flowchart showing a method of manufacturing at least a first product and a second product with at least a first machine and a second machine at minimum cost in an environment in which a cost of energy used by the first machine and the second machine varies as a function of time according to an example implementation. The method may include generating multiple chromosomes (1802). Each chromosome may include a job sequence matrix describing an order of performing tasks to manufacture the first product and the second product using the first machine and the second machine, and an idle time matrix describing idle times before performing the tasks in the order described by the job sequence matrix. The method may also include determining fitness scores of each of the chromosomes (1804) with the job sequence matrices and the idle time matrices. The fitness scores may be based on energy costs at the times that the first and second machines perform the tasks. The method may also include randomly generating, with probabilities based on the fitness scores, new chromosomes (1806). The method may also include determining fitness scores of the new chromosomes (1808). The method may also include selecting one of the new chromosomes (1810) with an optimal fitness score (1810). The method may also include manufacturing at least the first product and the second product (1812) with at least the first machine and the second machine according to a schedule based on the selected new chromosome.

According to an example implementation, the generating multiple chromosomes may include generating multiple chromosomes based on at least a first job associated with the first product and a second job associated with the second product. The first job may include at least a first task, and a second task to be performed after completing the first task. The second job may include at least a third task, and a fourth task to be performed after completing the third task. Each of the first machine and the second machine may perform only one task during a given time unit.

According to an example implementation, the first task may require one time unit, the second task may require one time unit, the third task may require two time units, and the fourth task may require two time units.

According to an example implementation, the first product may be associated with a first deadline and a first penalty cost per unit time for manufacturing the first product after the first deadline, the second product may be associated with a second deadline and a second penalty cost per unit time for manufacturing the second product after the second deadline, and the fitness scores for each of the chromosomes may be based on a sum of energy costs at the times that the first and second machines perform the tasks and the associated penalty costs for manufacturing the first and second products after the associated deadlines.

According to an example implementation, the method may include determining the fitness scores of each of the chromosomes and randomly generating new chromosomes a predetermined number of times.

According to an example implementation, the method may include determining the fitness scores of each of the chromosomes, randomly generating new chromosomes, and determining fitness scores of the new chromosomes until an improvement of an optimal fitness score of the new chromosomes is below a predetermined threshold.

According to an example implementation, the method may include randomly modifying the idle time matrices of each of the chromosomes before determining the fitness scores of each of the chromosomes.

According to an example implementation, the method may include optimizing the idle time matrices of each of the chromosomes for the job sequence matrices included in the respective chromosome before determining the fitness scores of each of the chromosomes.

According to an example implementation, the multiple chromosomes may include a first chromosome with a first job sequence matrix and a second chromosome with a second job sequence matrix, the second job sequence matrix describing a different order of performing a same set of tasks than the first job sequence matrix. The method may further include, before determining the fitness scores of each of the chromosomes, exchanging a first sequence of tasks from the first job sequence matrix with a second sequence of tasks from the second job sequence matrix, the first sequence of tasks and the second sequence of tasks including a same subset of the set of tasks that are performed on a same machine, with the tasks in the first job sequence matrix and the second job sequence matrix being performed in a different order.

According to an example implementation, the method may further include, before determining the fitness scores of each of the chromosomes, swapping, within at least one of the job sequence matrices, an order of performing at least a first task for manufacturing the first product on the first machine with a second task for manufacturing the second product on the first machine.

According to an example implementation, the multiple chromosomes may include a first chromosome with a first job sequence matrix and a second chromosome with a second job sequence matrix, the second job sequence matrix describing a different order of performing a same set of tasks than the first job sequence matrix. The method may further include, before determining the fitness scores of each of the chromosomes, exchanging a first sequence of tasks from the first job sequence matrix with a second sequence of tasks from the second job sequence matrix, the first sequence of tasks and the second sequence of tasks including a same set of tasks that are performed on a same machine, with the tasks in the first job sequence matrix and the second job sequence matrix being performed in a different order. The method may further include, before determining the fitness scores of each of the chromosomes, swapping, within at least one of the job sequence matrices, an order of performing at least a first task for manufacturing the first product on the first machine with a second task for manufacturing the second product on the first machine.

According to an example implementation, each machine may perform only one task at a time.

According to an example implementation, manufacturing at least the first product and the second product with at least the first machine and the second machine according to the schedule based on the selected new chromosome may include presenting the schedule to a user in a graphical format.

Figure 19:
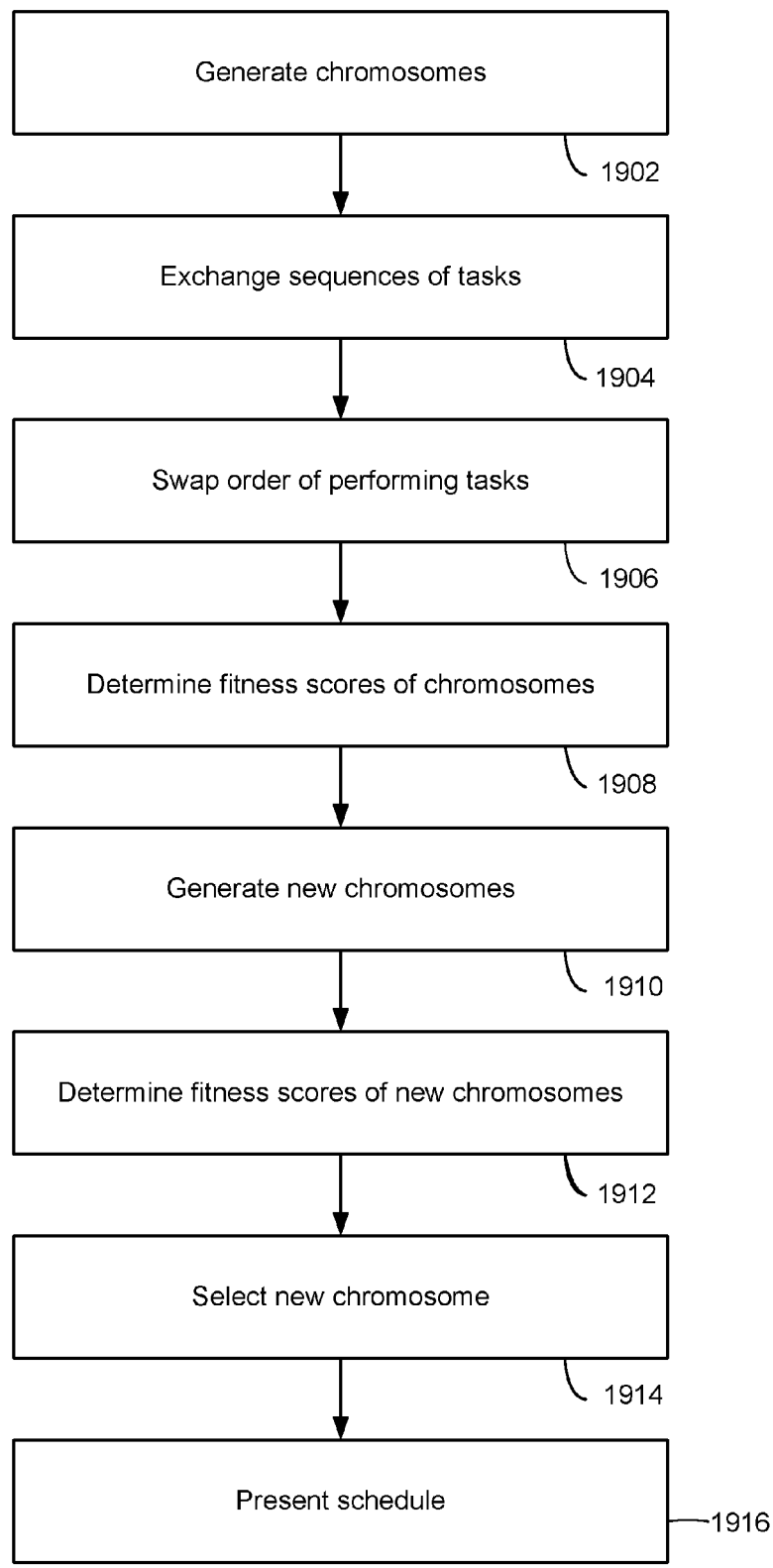
FIG. 19 is a flowchart showing a method according to another example implementation.

FIG. 19 is a flowchart showing a method of optimizing a schedule to manufacture at least a first product and a second product with at least a first machine and a second machine at minimum cost in an environment in which a cost of energy used by the first machine and the second machine varies as a function of time, the first product is associated with a first deadline and a first penalty cost per unit time for manufacturing the first product after the deadline, and the second product is associated with a second deadline and a second penalty cost per unit time for manufacturing the second product after the second deadline according to another example implementation. The method may include generate multiple chromosomes (1902). Each chromosome may include a job sequence matrix describing an order of performing tasks to manufacture the first product and the second product using the first machine and the second machine, and an idle time matrix describing idle times before performing the tasks in the order described by the job sequence matrix. The method may also include exchanging a first sequence of tasks from a first job sequence matrix from a first chromosome with a second sequence of tasks from a second job sequence matrix from a second chromosome (1904). The first sequence of tasks and the second sequence of tasks may include a subset of tasks from a same set of tasks and may be performed on a same machine with the tasks being performed in a different order. The method may also include swapping, within at least one of the job sequence matrices, an order of performing at least a first task for manufacturing the first product on the first machine with a second task for manufacturing the second product on the first machine (1906). The method may also include determining fitness scores of each of the chromosomes (1908) with the job sequence matrices and the idle time matrices. The fitness scores may be based on a sum of energy costs at the times that the first and second machines perform the tasks according to the respective chromosomes and the penalty costs of manufacturing the first and second products after the associated deadlines. The method may also include randomly generating, with probabilities based on the fitness scores, new chromosomes based on the chromosomes with the idle time matrices (1910). The method may also include determining fitness scores of the new chromosomes (1912). The method may also include selecting one of the new chromosomes with an optimal fitness score (1914). The method may also include presenting the schedule (1916) for manufacturing at least the first product and the second product to a user in a graphical format, the schedule being based on the selected new chromosome. The exchanging the first sequence of tasks, swapping the order of performing, determining fitness scores of each of the chromosomes, and randomly generating new chromosomes, may be included in a process that is performed multiple times.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of manufacturing at least a first product and a second product with at least a first machine and a second machine at minimum cost in an environment in which a cost of energy used by the first machine and the second machine varies as a function of time, the method comprising:
   generating multiple chromosomes, each chromosome including:
      a job sequence matrix describing an order of performing tasks to manufacture the first product and the second product using the first machine and the second machine; and
      an idle time matrix describing idle times before performing the tasks in the order described by the job sequence matrix;
   determining fitness scores of each of the chromosomes with the job sequence matrices and the idle time matrices, the fitness scores being based on energy costs at the times that the first and second machines perform the tasks;
   randomly generating, with probabilities based on the fitness scores, new chromosomes;
   determining fitness scores of the new chromosomes;
   selecting one of the new chromosomes with an optimal fitness score; and
   manufacturing at least the first product and the second product with at least the first machine and the second machine according to a schedule based on the selected new chromosome, the schedule determining when the first and second machines perform which tasks and when the first and second machines are idle.

2. The method of claim 1, wherein:
   the generating multiple chromosomes includes generating multiple chromosomes based on at least a first job associated with the first product and a second job associated with the second product,
   the first job includes at least a first task, and a second task to be performed after completing the first task,
   the second job includes at least a third task, and a fourth task to be performed after completing the third task, and
   each of the first machine and the second machine can perform only one task during a given time unit.

3. The method of claim 2, wherein the first task requires one time unit, the second task requires one time unit, the third task requires two time units, and the fourth task requires two time units.

4. The method of claim 1, wherein:
   the first product is associated with a first deadline and a first penalty cost per unit time for manufacturing the first product after the first deadline;
   the second product is associated with a second deadline and a second penalty cost per unit time for manufacturing the second product after the second deadline; and
   the fitness scores for each of the chromosomes are based on a sum of energy costs at the times that the first and second machines perform the tasks and the associated penalty costs for manufacturing the first and second products after the associated deadlines.

5. The method of claim 1, wherein the method includes determining the fitness scores of each of the chromosomes and randomly generating new chromosomes a predetermined number of times.

6. The method of claim 1, wherein the method includes determining the fitness scores of each of the chromosomes, randomly generating new chromosomes, and determining fitness scores of the new chromosomes until an improvement of an optimal fitness score of the new chromosomes is below a predetermined threshold.

7. The method of claim 1, wherein the method includes randomly modifying the idle time matrices of each of the chromosomes before determining the fitness scores of each of the chromosomes.

8. The method of claim 1, wherein the method includes optimizing the idle time matrices of each of the chromosomes for the job sequence matrices included in the respective chromosome before determining the fitness scores of each of the chromosomes.

9. The method of claim 1, wherein:
   the multiple chromosomes includes a first chromosome with a first job sequence matrix and a second chromosome with a second job sequence matrix, the second job sequence matrix describing a different order of performing a same set of tasks than the first job sequence matrix; and
   the method further includes, before determining the fitness scores of each of the chromosomes, exchanging a first sequence of tasks from the first job sequence matrix with a second sequence of tasks from the second job sequence matrix, the first sequence of tasks and the second sequence of tasks including a same subset of the set of tasks that are performed on a same machine, with the tasks in the first job sequence matrix and the second job sequence matrix being performed in a different order.

10. The method of claim 1, wherein the method further includes, before determining the fitness scores of each of the chromosomes, swapping, within at least one of the job sequence matrices, an order of performing at least a first task for manufacturing the first product on the first machine with a second task for manufacturing the second product on the first machine.

11. The method of claim 1, wherein:
the multiple chromosomes includes a first chromosome with a first job sequence matrix and a second chromosome with a second job sequence matrix, the second job sequence matrix describing a different order of performing a same set of tasks than the first job sequence matrix;
the method further includes, before determining the fitness scores of each of the chromosomes, exchanging a first sequence of tasks from the first job sequence matrix with a second sequence of tasks from the second job sequence matrix, the first sequence of tasks and the second sequence of tasks including a same set of tasks that are performed on a same machine, with the tasks in the first job sequence matrix and the second job sequence matrix being performed in a different order; and
the method further includes, before determining the fitness scores of each of the chromosomes, swapping, within at least one of the job sequence matrices, an order of performing at least a first task for manufacturing the first product on the first machine with a second task for manufacturing the second product on the first machine.

12. The method of claim 1, wherein each machine can perform only one task at a time.

13. The method of claim 1, wherein manufacturing at least the first product and the second product with at least the first machine and the second machine according to the schedule based on the selected new chromosome includes presenting the schedule to a user in a graphical format.

14. A non-transitory computer-readable storage medium comprising instructions stored thereon for optimizing a schedule to manufacture at least a first product and a second product with at least a first machine and a second machine at minimum cost in an environment in which a cost of energy used by the first machine and the second machine varies as a function of time, the instructions, when executed by at least one processor, being configured to cause a computing system to at least:
generate multiple chromosomes, each chromosome including:
a job sequence matrix describing an order of performing tasks to manufacture the first product and the second product using the first machine and the second machine; and
an idle time matrix describing idle times before performing the tasks in the order described by the job sequence matrix;
determine fitness scores of each of the chromosomes with the job sequence matrices and the idle time matrices, the fitness scores being based on energy costs at the times that the first and second machines perform the tasks;
randomly generate, with probabilities based on the fitness scores, new chromosomes based on the chromosomes with the idle time matrices;
determine fitness scores of the new chromosomes;
select one of the new chromosomes with an optimal fitness score; and
instruct the first machine and the second machine to manufacture at least the first product and the second product according to the schedule, the schedule being based on the selected new chromosome, the schedule determining when the first and second machines perform which tasks and when the first and second machines are idle.

15. The non-transitory computer-readable storage medium of claim 14, wherein:
the first product is associated with a first deadline and a first penalty cost per unit time for manufacturing the first product after the first deadline;
the second product is associated with a second deadline and a second penalty cost per unit time for manufacturing the second product after the second deadline; and
the fitness scores for each of the chromosomes are based on a sum of energy costs at the times that the first and second machines perform the tasks and the associated penalty costs for manufacturing the first and second products after the associated deadlines.

16. The non-transitory computer-readable storage medium of claim 14, wherein the instructions are further configured to cause the computing system to optimize the idle time matrices of each of the chromosomes for the job sequence matrices included in the respective chromosome before determining the fitness scores of each of the chromosomes.

17. The non-transitory computer-readable storage medium of claim 14, wherein:
the multiple chromosomes includes a first chromosome with a first job sequence matrix and a second chromosome with a second job sequence matrix, the second job sequence matrix describing a different order of performing a same set of tasks than the first job sequence matrix; and
the instructions are further configured to cause the computing system to, before determining the fitness scores of each of the chromosomes, exchange a first sequence of tasks from the first job sequence matrix with a second sequence of tasks from the second job sequence matrix, the first sequence of tasks and the second sequence of tasks including a same subset of the set of tasks that are performed on a same machine, with the tasks in the first job sequence matrix and the second job sequence matrix being performed in a different order.

18. The non-transitory computer-readable storage medium of claim 14, wherein the instructions are further configured to cause the computing system to, before determining the fitness scores of each of the chromosomes, swap, within at least one of the job sequence matrices, an order of performing at least a first task for manufacturing the first product on the first machine with a second task for manufacturing the second product on the first machine.

19. The non-transitory computer-readable storage medium of claim 14, wherein:
the multiple chromosomes includes a first chromosome with a first job sequence matrix and a second chromosome with a second job sequence matrix, the second job sequence matrix describing a different order of performing a same set of tasks than the first job sequence matrix;
the instructions are further configured to cause the computing system to, before determining the fitness scores of each of the chromosomes:
exchange a first sequence of tasks from the first job sequence matrix with a second sequence of tasks from the second job sequence matrix, the first sequence of tasks and the second sequence of tasks including a subset of the set of tasks to be performed on a same machine with the tasks being performed in a different order; and swap, within at least one of the job sequence matrices, an order of performing at least a first task for manufacturing the first product on the first machine with a second task for manufacturing the second product on the first machine.

20. A method of manufacturing at least a first product and a second product with at least a first machine and a second machine at minimum cost in an environment in which a cost of energy used by the first machine and the second machine varies as a function of time, the first product is associated with a first deadline and a first penalty cost per unit time for manufacturing the first product after the deadline, and the second product is associated with a second deadline and a second penalty cost per unit time for manufacturing the second product after the second deadline, the method comprising:

generating multiple chromosomes, each chromosome including:
a job sequence matrix describing an order of performing tasks to manufacture the first product and the second product using the first machine and the second machine; and
an idle time matrix describing idle times before performing the tasks in the order described by the job sequence matrix;

exchanging a first sequence of tasks from a first job sequence matrix from a first chromosome with a second sequence of tasks from a second job sequence matrix from a second chromosome, the first sequence of tasks and the second sequence of tasks including a subset of tasks from a same set of tasks and being performed on a same machine with the tasks being performed in a different order;

swapping, within at least one of the job sequence matrices, an order of performing at least a first task for manufacturing the first product on the first machine with a second task for manufacturing the second product on the first machine;

determining fitness scores of each of the chromosomes with the job sequence matrices and the idle time matrices, the fitness scores being based on a sum of energy costs at the times that the first and second machines perform the tasks according to the respective chromosomes and the penalty costs of manufacturing the first and second products after the associated deadlines;

randomly generating, with probabilities based on the fitness scores, new chromosomes based on the chromosomes with the idle time matrices;

determining fitness scores of the new chromosomes;

selecting one of the new chromosomes with an optimal fitness score; and manufacturing at least the first product and the second product according to a schedule, the schedule being based on the selected new chromosome, the schedule determining when the first and second machines perform which tasks and when the first and second machines are idle, wherein the exchanging the first sequence of tasks, swapping the order of performing, determining fitness scores of each of the chromosomes, and randomly generating new chromosomes, are included in a process that is performed multiple times.

\* \* \* \* \*